United States Patent
Krall et al.

(10) Patent No.: US 9,120,290 B2
(45) Date of Patent: Sep. 1, 2015

(54) FLEXIBLE SCREEN BACKED WITH RIGID RIBS

(71) Applicants: Emory Krall, Philadelphia, PA (US); Ruiqing Ma, Morristown, NJ (US); Michael Hack, Princeton, NJ (US)

(72) Inventors: Emory Krall, Philadelphia, PA (US); Ruiqing Ma, Morristown, NJ (US); Michael Hack, Princeton, NJ (US)

(73) Assignee: UNIVERSAL DISPLAY CORPORATION, Ewing, NJ (US)

( * ) Notice: Subject to any disclaimer, the term of this patent is extended or adjusted under 35 U.S.C. 154(b) by 0 days.

(21) Appl. No.: 13/648,907

(22) Filed: Oct. 10, 2012

(65) Prior Publication Data

US 2014/0099479 A1   Apr. 10, 2014

(51) Int. Cl.

| | |
|---|---|
| *B32B 3/14* | (2006.01) |
| *B32B 3/28* | (2006.01) |
| *G09F 9/30* | (2006.01) |
| *G09F 9/302* | (2006.01) |
| *G02F 1/1333* | (2006.01) |
| *G06F 1/16* | (2006.01) |
| *H04M 1/02* | (2006.01) |
| *G09F 9/35* | (2006.01) |
| *G09F 11/29* | (2006.01) |

(52) U.S. Cl.
CPC ... *B32B 3/14* (2013.01); *B32B 3/28* (2013.01); *G06F 1/1624* (2013.01); *G06F 1/1652* (2013.01); *G06F 1/1679* (2013.01); *G09F 9/301* (2013.01); *G09F 9/3023* (2013.01); *G02F 1/133305* (2013.01); *G06F 1/1616* (2013.01); *G06F 1/1641* (2013.01); *G06F 1/1681* (2013.01); *G09F 9/30* (2013.01); *G09F 9/35* (2013.01); *G09F 11/29* (2013.01); *H04M 1/0216* (2013.01); *H04M 1/0268* (2013.01); *Y10S 345/905* (2013.01); *Y10T 428/24628* (2015.01); *Y10T 428/24802* (2015.01)

(58) Field of Classification Search
None
See application file for complete search history.

(56) References Cited

U.S. PATENT DOCUMENTS

| | | | | |
|---|---|---|---|---|
| 4,658,877 | A | * | 4/1987 | Quinn .............................. 160/46 |
| 4,769,292 | A | | 9/1988 | Tang et al. |
| 5,009,905 | A | * | 4/1991 | Ikeda ............................. 426/297 |
| 5,247,190 | A | | 9/1993 | Friend et al. |
| 5,503,210 | A | * | 4/1996 | Colson et al. ............... 160/84.05 |
| 5,560,412 | A | * | 10/1996 | Murray ........................... 160/67 |
| 5,703,436 | A | | 12/1997 | Forrest et al. |

(Continued)

FOREIGN PATENT DOCUMENTS

| | | |
|---|---|---|
| WO | 2004/047059 | 6/2004 |
| WO | 2006/038171 | 4/2006 |

(Continued)

OTHER PUBLICATIONS

[NPL #1] G. Deschamps, et al. "Convertible Container". WIPO, Aug. 23, 2012, (WO 2012/110400 A1—machine translation).*

(Continued)

*Primary Examiner* — David Sample
*Assistant Examiner* — Donald M Flores, Jr.
(74) *Attorney, Agent, or Firm* — Morris & Kamlay LLP

(57) ABSTRACT

A device is disclosed that includes one or more ribs that allow a flexible device, such as an OLED display, to flex in a first direction but resist flexing in a second direction. The ribs may have stiffening elements attached to them that may lessen flexing in the first direction. Sensors may also be incorporated that signal the stiffening elements. The ribs and stiffening elements have application to a variety of display types such as cell phones, TVs, and movie screens.

30 Claims, 15 Drawing Sheets

(56) References Cited

U.S. PATENT DOCUMENTS

| | | | |
|---|---|---|---|
| 5,707,745 | A | 1/1998 | Forrest et al. |
| 5,834,893 | A | 11/1998 | Bulovic et al. |
| 5,844,363 | A | 12/1998 | Gu et al. |
| 6,013,982 | A | 1/2000 | Thompson et al. |
| 6,087,196 | A | 7/2000 | Sturm et al. |
| 6,091,195 | A | 7/2000 | Forrest et al. |
| 6,097,147 | A | 8/2000 | Baldo et al. |
| 6,294,398 | B1 | 9/2001 | Kim et al. |
| 6,303,238 | B1 | 10/2001 | Thompson et al. |
| 6,337,102 | B1 | 1/2002 | Forrest et al. |
| 6,468,819 | B1 | 10/2002 | Kim et al. |
| 7,050,835 | B2 * | 5/2006 | Hack et al. ............ 455/566 |
| 7,180,665 | B2 * | 2/2007 | Daniel et al. ............ 359/461 |
| 7,279,704 | B2 | 10/2007 | Walters et al. |
| 7,431,968 | B1 | 10/2008 | Shtein et al. |
| 7,558,057 | B1 * | 7/2009 | Naksen et al. ........... 361/679.56 |
| 7,710,370 | B2 * | 5/2010 | Slikkerveer et al. ............ 345/85 |
| 7,884,815 | B2 | 2/2011 | Fraser et al. |
| 7,968,146 | B2 | 6/2011 | Wagner et al. |
| 8,005,518 | B1 | 8/2011 | Birsel et al. |
| 8,096,068 | B2 | 1/2012 | Van Rens |
| 2002/0194702 | A1 * | 12/2002 | Hinkley et al. ................. 16/260 |
| 2003/0109286 | A1 | 6/2003 | Hack et al. |
| 2003/0230980 | A1 | 12/2003 | Forrest et al. |
| 2004/0174116 | A1 | 9/2004 | Lu et al. |
| 2006/0146488 | A1 * | 7/2006 | Kimmel ........................ 361/681 |
| 2007/0097014 | A1 * | 5/2007 | Solomon et al. ............... 345/1.1 |
| 2007/0145195 | A1 * | 6/2007 | Thomson et al. .......... 244/172.6 |
| 2008/0068288 | A1 | 3/2008 | Henkel |
| 2010/0064564 | A1 * | 3/2010 | Bemelmans et al. ...... 40/607.01 |
| 2010/0163684 | A1 * | 7/2010 | Dando et al. ................ 244/172.6 |
| 2010/0220060 | A1 * | 9/2010 | Kobayashi ..................... 345/168 |
| 2012/0038570 | A1 | 2/2012 | Delaporte et al. |
| 2013/0044487 | A1 * | 2/2013 | Burrows et al. .......... 362/249.08 |

FOREIGN PATENT DOCUMENTS

| | | |
|---|---|---|
| WO | 2008057394 | 5/2008 |
| WO | 2008133510 | 11/2008 |
| WO | 2009/067010 | 5/2009 |
| WO | 2010011390 | 1/2010 |
| WO | WO 2012110400 A1 * | 8/2012 |

OTHER PUBLICATIONS

Baldo et al.,"Highly efficient phosphorescent emission from organic electroluminescent devices", Nature, vol. 395, pp. 151-154, 1998.

Baldo et al.,"Very high-efficiency green organic light-emitting devices based on electrophosphorescence", Applied Physics Letter, vol. 75, No. 1, pp. 4-6, 1999.

* cited by examiner

Prior Art

Prior Art

310

320

330

340

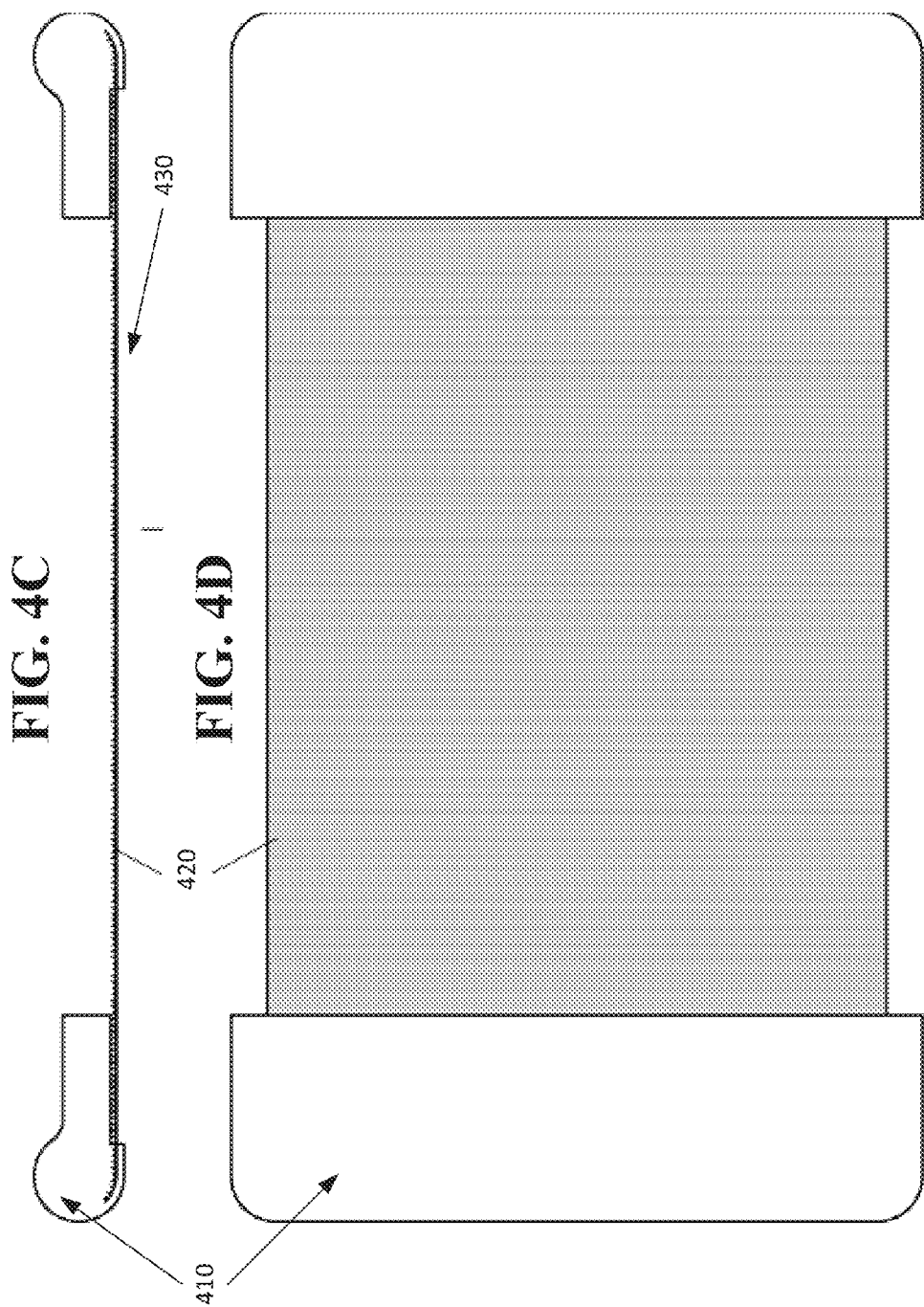

FLEXIBLE SCREEN BACKED WITH RIGID RIBS

PRIORITY

The claimed invention was made by, on behalf of, and/or in connection with one or more of the following parties to a joint university corporation research agreement: Regents of the University of Michigan, Princeton University, The University of Southern California, and the Universal Display Corporation. The agreement was in effect on and before the date the claimed invention was made, and the claimed invention was made as a result of activities undertaken within the scope of the agreement.

FIELD OF THE INVENTION

The present invention relates to organic light emitting devices and, more specifically, to organic light emitting devices having flexible displays that can be used in multiple configurations.

BACKGROUND

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include organic light emitting devices (OLEDs), organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

One application for phosphorescent emissive molecules is a full color display. Industry standards for such a display call for pixels adapted to emit particular colors, referred to as "saturated" colors. In particular, these standards call for saturated red, green, and blue pixels. Color may be measured using CIE coordinates, which are well known to the art.

One example of a green emissive molecule is tris(2-phenylpyridine)iridium, denoted Ir(ppy)3, which has the following structure:

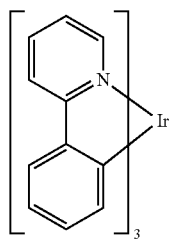

In this, and later figures herein, we depict the dative bond from nitrogen to metal (here, Ir) as a straight line.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

As used herein, "top" means furthest away from the substrate, while "bottom" means closest to the substrate. Where a first layer is described as "disposed over" a second layer, the first layer is disposed further away from substrate. There may be other layers between the first and second layer, unless it is specified that the first layer is "in contact with" the second layer. For example, a cathode may be described as "disposed over" an anode, even though there are various organic layers in between.

As used herein, "solution processible" means capable of being dissolved, dispersed, or transported in and/or deposited from a liquid medium, either in solution or suspension form.

A ligand may be referred to as "photoactive" when it is believed that the ligand directly contributes to the photoactive properties of an emissive material. A ligand may be referred to as "ancillary" when it is believed that the ligand does not contribute to the photoactive properties of an emissive material, although an ancillary ligand may alter the properties of a photoactive ligand.

As used herein, and as would be generally understood by one skilled in the art, a first "Highest Occupied Molecular Orbital" (HOMO) or "Lowest Unoccupied Molecular Orbital" (LUMO) energy level is "greater than" or "higher than" a second HOMO or LUMO energy level if the first energy level is closer to the vacuum energy level. Since ionization potentials (IP) are measured as a negative energy relative to a vacuum level, a higher HOMO energy level corresponds to an IP having a smaller absolute value (an IP that is less negative). Similarly, a higher LUMO energy level corresponds to an electron affinity (EA) having a smaller absolute value (an EA that is less negative). On a conventional energy level diagram, with the vacuum level at the top, the LUMO energy level of a material is higher than the HOMO energy level of the same material. A "higher" HOMO or LUMO energy level appears closer to the top of such a diagram than a "lower" HOMO or LUMO energy level.

As used herein, and as would be generally understood by one skilled in the art, a first work function is "greater than" or "higher than" a second work function if the first work function has a higher absolute value. Because work functions are generally measured as negative numbers relative to vacuum level, this means that a "higher" work function is more negative. On a conventional energy level diagram, with the vacuum level at the top, a "higher" work function is illustrated as further away from the vacuum level in the downward direction. Thus, the definitions of HOMO and LUMO energy levels follow a different convention than work functions.

More details on OLEDs, and the definitions described above, can be found in U.S. Pat. No. 7,279,704, which is incorporated herein by reference in its entirety.

SUMMARY OF THE INVENTION

A device is provided that includes a flexible device that may be changed from a first device configuration with a first curvature to a second device configuration with a second curvature that is different from the first curvature. The flexible device may include a display, an emissive device, an active matrix backplane, an OLED, or any combination thereof. A larger area of the device may be visible in the first device configuration than in the second device configuration. The first device configuration may cause the flexible device to be substantially flat. The device may be a component of, for example, a smartphone, a tablet, a wrist watch, a television, a digital picture frame, or a cylindrical lamp shade.

In an embodiment, a flexible device is provided that includes two or more ribs and a locking mechanism. The locking mechanism may convert the ribs from a first configuration in which the ribs allow the device to flex to a second configuration that causes the flexible device to remain rigid. The ribs may receive a signal to convert from the first configuration to the second configuration. The plurality of ribs may be attached to the flexible device. The flexible device may include a display, an emissive device, an active matrix backplane, an OLED, or any combination thereof.

Two or more ribs may be physically connected to the flexible device such as an OLED. Each of the ribs may include a rigid member. The ribs may be altered from a first rib configuration that prevents the flexible display from flexing in at least one direction to a second rib configuration that allows the flexible display to flex in the at least one direction. In the first rib configuration, the ribs may maintain the flexible device in the first device configuration. The ribs may be arranged in a first direction that allows the flexible display to flex only in a second direction that is substantially orthogonal to the first direction. The ribs may be changed from the first rib configuration to a third rib configuration. The device may be configured to have a third device configuration. The third device configuration may have a third curvature different from the first curvature and the second curvature. In some configurations, the ribs may be substantially parallel such that the flexible device can flex in a direction that is substantially parallel to the ribs. The ribs may receive a signal to convert from the first configuration to the second configuration. The signal may include an electrical impulse, a tension at least at one end of the device, and a compression of at least one end of the device.

The device may also include stiffening elements that are physically connected to the ribs which, when activated, maintain the ribs in the second rib configuration. The stiffening elements may include an element type such as motorized rods, rotating pins, pneumatic bladders, and electromagnets. In some configurations, the stiffening elements may be disposed between each pair of adjacent ribs. The stiffening elements may alter the rigidity of the display.

BRIEF DESCRIPTION OF THE DRAWINGS

FIG. 4C shows a cut-away view of the housing at the mid-point and a flexible display as disclosed herein.

FIG. 4D shows a cut-away back view showing a flexible display as disclosed herein.

DETAILED DESCRIPTION

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

The initial OLEDs used emissive molecules that emitted light from their singlet states ("fluorescence") as disclosed, for example, in U.S. Pat. No. 4,769,292, which is incorporated by reference in its entirety. Fluorescent emission generally occurs in a time frame of less than 10 nanoseconds.

More recently, OLEDs having emissive materials that emit light from triplet states ("phosphorescence") have been demonstrated. Baldo et al., "Highly Efficient Phosphorescent Emission from Organic Electroluminescent Devices," Nature, vol. 395, 151-154, 1998; ("Baldo-I") and Baldo et al., "Very high-efficiency green organic light-emitting devices based on electrophosphorescence," Appl. Phys. Lett., vol. 75, No. 3, 4-6 (1999) ("Baldo-II"), which are incorporated by reference in their entireties. Phosphorescence is described in more detail in U.S. Pat. No. 7,279,704 at cols. 5-6, which are incorporated by reference.

Figure 1:
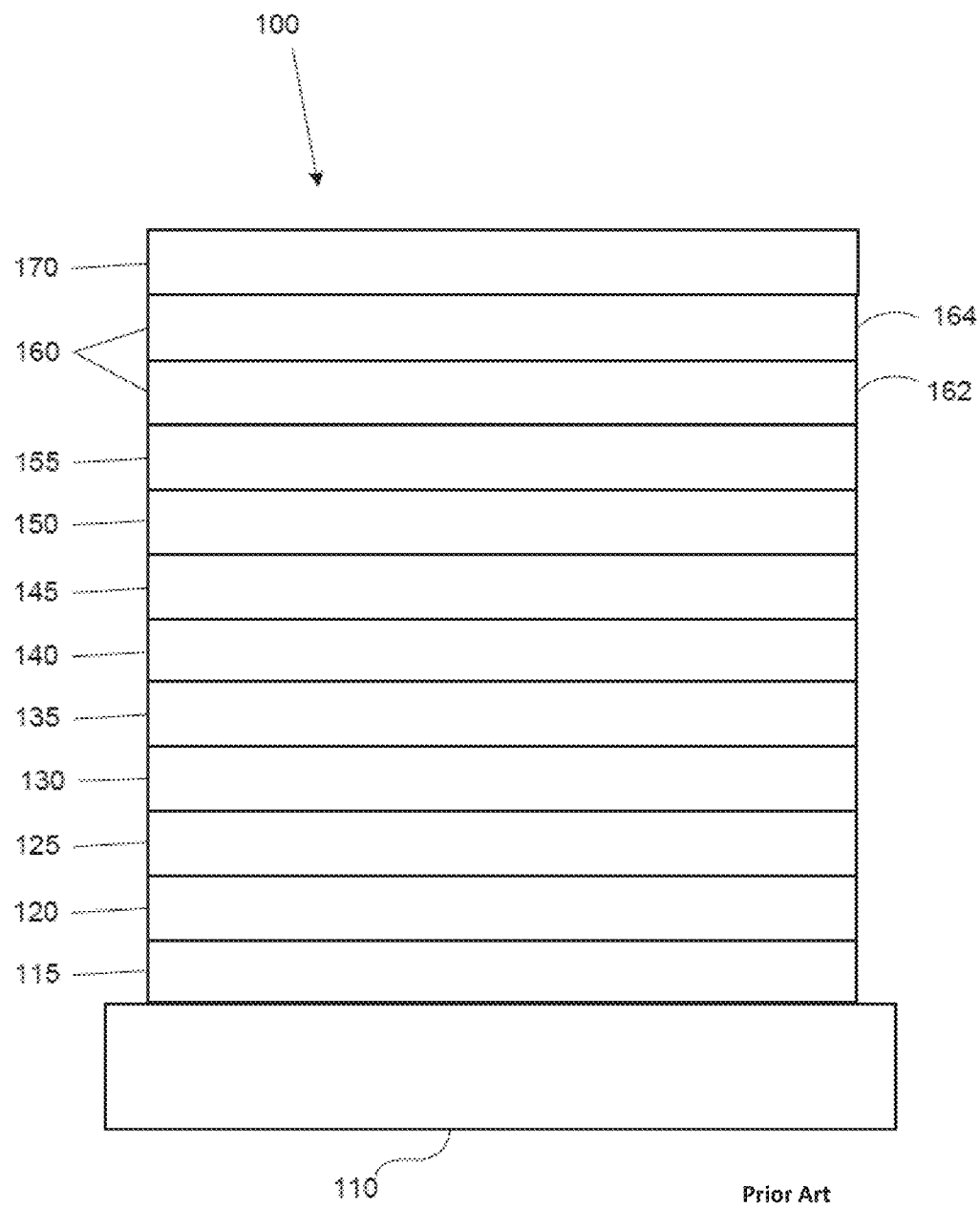
FIG. 1 shows an organic light emitting device.

FIG. 1 shows an organic light emitting device 100. The figures are not necessarily drawn to scale. Device 100 may include a substrate 110, an anode 115, a hole injection layer 120, a hole transport layer 125, an electron blocking layer 130, an emissive layer 135, a hole blocking layer 140, an electron transport layer 145, an electron injection layer 150, a protective layer 155, a cathode 160, and a barrier layer 170. Cathode 160 is a compound cathode having a first conductive layer 162 and a second conductive layer 164. Device 100 may be fabricated by depositing the layers described, in order. The properties and functions of these various layers, as well as example materials, are described in more detail in U.S. Pat. No. 7,279,704 at cols. 6-10, which are incorporated by reference.

More examples for each of these layers are available. For example, a flexible and transparent substrate-anode combination is disclosed in U.S. Pat. No. 5,844,363, which is incorporated by reference in its entirety. An example of a p-doped hole transport layer is m-MTDATA doped with $F_4$-TCNQ at a molar ratio of 50:1, as disclosed in U.S. Patent Application Publication No. 2003/0230980, which is incorporated by reference in its entirety. Examples of emissive and host materials are disclosed in U.S. Pat. No. 6,303,238 to Thompson et al., which is incorporated by reference in its entirety. An example of an n-doped electron transport layer is BPhen doped with Li at a molar ratio of 1:1, as disclosed in U.S. Patent Application Publication No. 2003/0230980, which is incorporated by reference in its entirety. U.S. Pat. Nos. 5,703,436 and 5,707,745, which are incorporated by reference in their entireties, disclose examples of cathodes including compound cathodes having a thin layer of metal such as Mg:Ag with an overlying transparent, electrically-conductive, sputter-deposited ITO layer. The theory and use of blocking layers is described in more detail in U.S. Pat. No. 6,097,147 and U.S. Patent Application Publication No. 2003/0230980, which are incorporated by reference in their entireties. Examples of injection layers are provided in U.S. Patent Application Publication No. 2004/0174116, which is incorporated by reference in its entirety. A description of protective layers may be found in U.S. Patent Application Publication No. 2004/0174116, which is incorporated by reference in its entirety.

Figure 2:
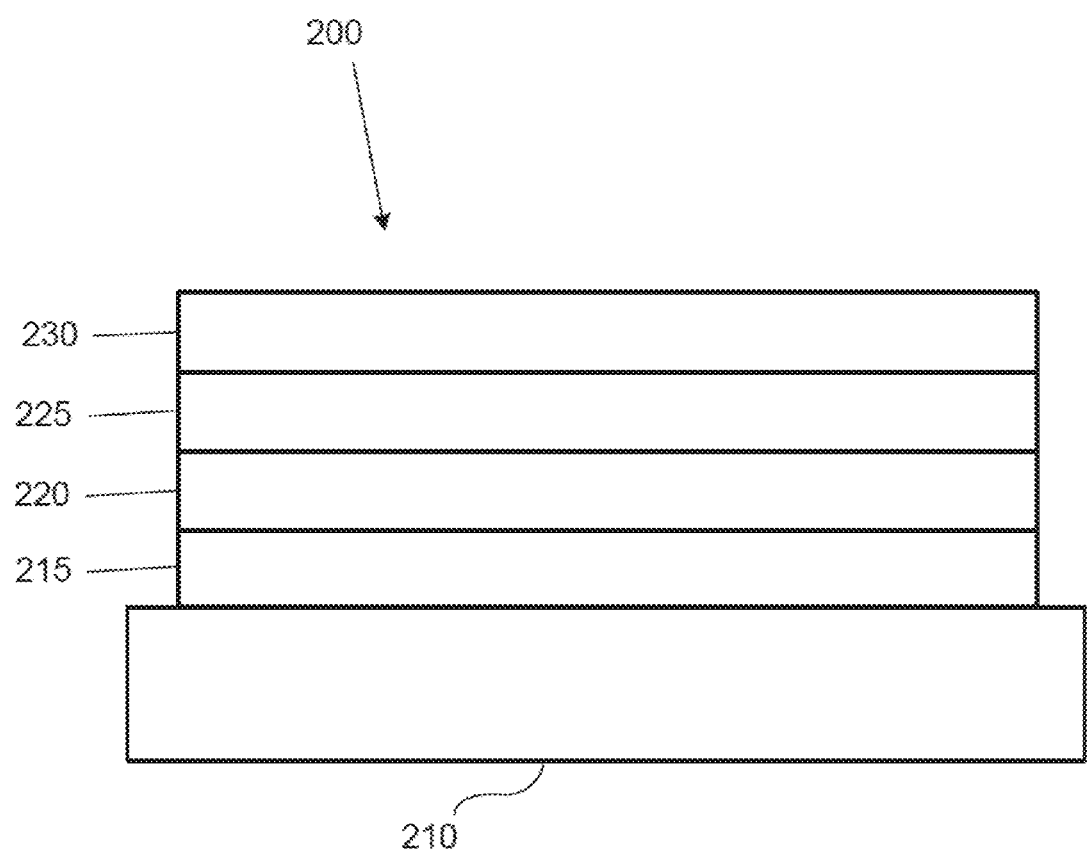
FIG. 2 shows an inverted organic light emitting device that does not have a separate electron transport layer.

FIG. 2 shows an inverted OLED 200. The device includes a substrate 210, a cathode 215, an emissive layer 220, a hole transport layer 225, and an anode 230. Device 200 may be fabricated by depositing the layers described, in order. Because the most common OLED configuration has a cathode disposed over the anode, and device 200 has cathode 215 disposed under anode 230, device 200 may be referred to as an "inverted" OLED. Materials similar to those described with respect to device 100 may be used in the corresponding layers of device 200. FIG. 2 provides one example of how some layers may be omitted from the structure of device 100.

The simple layered structure illustrated in FIGS. 1 and 2 is provided by way of non-limiting example, and it is understood that embodiments of the invention may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although many of the examples provided herein describe various layers as comprising a single material, it is understood that combinations of materials, such as a mixture of host and dopant, or more generally a mixture, may be used. Also, the layers may have various sublayers. The names given to the various layers herein are not intended to be strictly limiting. For example, in device 200, hole transport layer 225 transports holes and injects holes into emissive layer 220, and may be described as a hole transport layer or a hole injection layer. In one embodiment, an OLED may be described as having an "organic layer" disposed between a cathode and an anode. This organic layer may comprise a single layer, or may further comprise multiple layers of different organic materials as described, for example, with respect to FIGS. 1 and 2.

Structures and materials not specifically described may also be used, such as OLEDs comprised of polymeric materials (PLEDs) such as disclosed in U.S. Pat. No. 5,247,190 to Friend et al., which is incorporated by reference in its entirety. By way of further example, OLEDs having a single organic layer may be used. OLEDs may be stacked, for example as described in U.S. Pat. No. 5,707,745 to Forrest et al, which is incorporated by reference in its entirety. The OLED structure may deviate from the simple layered structure illustrated in FIGS. 1 and 2. For example, the substrate may include an angled reflective surface to improve out-coupling, such as a mesa structure as described in U.S. Pat. No. 6,091,195 to Forrest et al., and/or a pit structure as described in U.S. Pat. No. 5,834,893 to Bulovic et al., which are incorporated by reference in their entireties.

Unless otherwise specified, any of the layers of the various embodiments may be deposited by any suitable method. For the organic layers, preferred methods include thermal evaporation, ink-jet, such as described in U.S. Pat. Nos. 6,013,982 and 6,087,196, which are incorporated by reference in their entireties, organic vapor phase deposition (OVPD), such as described in U.S. Pat. No. 6,337,102 to Forrest et al., which is incorporated by reference in its entirety, and deposition by organic vapor jet printing (OVJP), such as described in U.S. patent application Ser. No. 10/233,470, which is incorporated by reference in its entirety. Other suitable deposition methods include spin coating and other solution based processes. Solution based processes are preferably carried out in nitrogen or an inert atmosphere. For the other layers, preferred methods include thermal evaporation. Preferred patterning methods include deposition through a mask, cold welding such as described in U.S. Pat. Nos. 6,294,398 and 6,468,819, which are incorporated by reference in their entireties, and patterning associated with some of the deposition methods such as ink jet and OVJD. Other methods may also be used. The materials to be deposited may be modified to make them compatible with a particular deposition method. For example, substituents such as alkyl and aryl groups, branched or unbranched, and preferably containing at least 3 carbons, may be used in small molecules to enhance their ability to undergo solution processing. Substituents having 20 carbons or more may be used, and 3-20 carbons is a preferred range. Materials with asymmetric structures may have better solution processibility than those having symmetric structures, because asymmetric materials may have a lower tendency to recrystallize. Dendrimer substituents may be used to enhance the ability of small molecules to undergo solution processing.

Devices fabricated in accordance with embodiments of the present invention may further optionally comprise a barrier layer. One purpose of the barrier layer is to protect the electrodes and organic layers from damaging exposure to harmful species in the environment including moisture, vapor and/or gases, etc. The barrier layer may be deposited over, under or next to a substrate, an electrode, or over any other parts of a device including an edge. The barrier layer may comprise a single layer, or multiple layers. The barrier layer may be formed by various known chemical vapor deposition techniques and may include compositions having a single phase as well as compositions having multiple phases. Any suitable material or combination of materials may be used for the barrier layer. The barrier layer may incorporate an inorganic or an organic compound or both. The preferred barrier layer comprises a mixture of a polymeric material and a non-polymeric material as described in U.S. Pat. No. 7,968,146, PCT Pat. Application Nos. PCT/US2007/023098 and PCT/US2009/042829, which are herein incorporated by reference in their entireties. To be considered a "mixture", the aforesaid polymeric and non-polymeric materials comprising the barrier layer should be deposited under the same reaction conditions and/or at the same time. The weight ratio of polymeric to non-polymeric material may be in the range of 95:5 to 5:95. The polymeric material and the non-polymeric material may be created from the same precursor material. In one example, the mixture of a polymeric material and a non-polymeric material consists essentially of polymeric silicon and inorganic silicon.

Devices fabricated in accordance with embodiments of the invention may be incorporated into a wide variety of consumer products, including flat panel displays, computer monitors, medical monitors, televisions, billboards, lights for interior or exterior illumination and/or signaling, heads up displays, fully transparent displays, flexible displays, laser printers, telephones, cell phones, personal digital assistants (PDAs), laptop computers, digital cameras, camcorders, viewfinders, micro-displays, vehicles, a large area wall, theater or stadium screen, or a sign. Various control mechanisms may be used to control devices fabricated in accordance with the present invention, including passive matrix and active matrix. Many of the devices are intended for use in a temperature range comfortable to humans, such as 18 degrees C. to 30 degrees C., and more preferably at room temperature (20-25 degrees C.).

The materials and structures described herein may have applications in devices other than OLEDs. For example, other optoelectronic devices such as organic solar cells and organic photodetectors may employ the materials and structures. More generally, organic devices, such as organic transistors, may employ the materials and structures.

The terms halo, halogen, alkyl, cycloalkyl, alkenyl, alkynyl, arylkyl, heterocyclic group, aryl, aromatic group, and heteroaryl are known to the art, and are defined in U.S. Pat. No. 7,279,704 at cols. 31-32, which are incorporated herein by reference.

An organic light emitting device is provided. The device may include an anode, a cathode, and an organic emissive layer disposed between the anode and the cathode. The organic emissive layer may include a host and a phosphorescent dopant. OLEDs may be designed to be a component of a flexible display by altering the composition of the materials that make up the display compared to conventional rigid displays such as a LCD. An advantage of a flexible display is that it can be rolled or folded into more compact forms for storage, transportation, etc.

Thin film deposition processes can be used for depositing pixels onto a collapsible substrate to form a collapsible display. Preferably, the display may be fabricated on a flexible substrate, such as plastic or thin metal foil.

Active-matrix backplanes that are compatible with plastic substrates can be fabricated, and deposited onto the flexible substrate. The pixels can then be deposited thereon. Though active-matrix displays are preferred, it should be understood that passive-matrix displays can also be used in accordance with the principles of the invention. Active-matrix displays typically use transistors to keep their diodes in an on or off state. Passive-matrix displays, on the other hand, apply current to the diodes at a specific refresh rate to maintain an image.

OLED display technology may be desirable for use on such flexible substrates because of, among other reasons, its very low substrate temperature during deposition, as well as its high brightness at low power levels. Small molecule OLEDs can be used, such as described in U.S. Pat. No. 5,844,363, for example, which is incorporated herein by reference in its entirety. Encapsulation to prevent moisture and oxygen from permeating through the plastic films and degrading the OLED performance is also preferably provided, for example, such as disclosed on U.S. Pat. No. 5,771,562.

Figure 3:
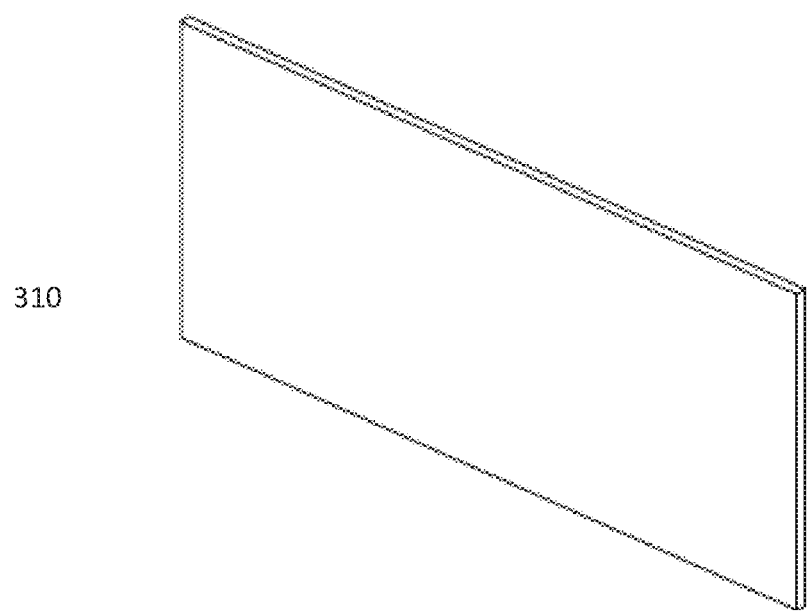
FIG. 3 shows angled, top down views of example curvatures possible with a flexible display as disclosed herein.
Figure 3:
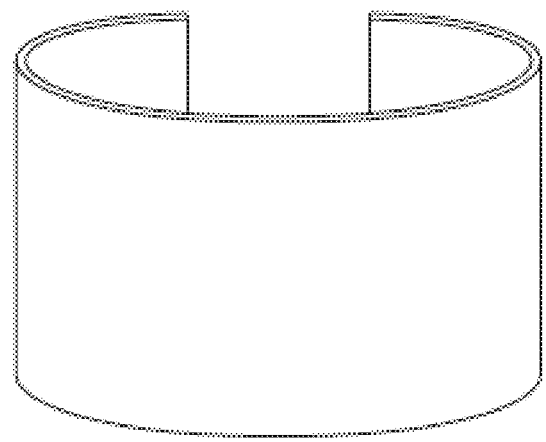
Figure 3:
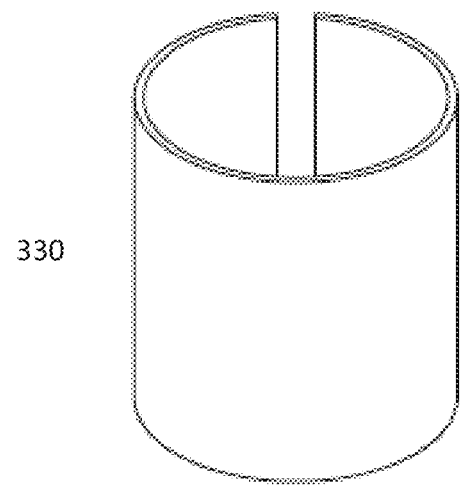
Figure 3:
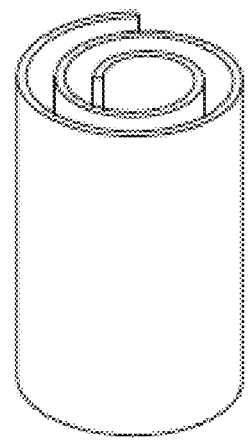

In an embodiment, a display is provided that may be configured in each of a rigid state and a flexible state. A device may include a flexible display that has a first display configuration with a first curvature, which can then be configured to have a second display configuration with a second curvature. As used herein, a particular curvature for a device may refer to a completely flat configuration, a completely rolled configuration, or a configuration that is rolled at one or both ends and substantially flat elsewhere. FIG. 3 shows angled, top down views of example curvatures possible with a flexible display. A display may be completely flat 310, elliptical 320, circular 330, or have a spiral shape 340. For both the elliptical 320 and circular 330 shapes the ends of the display come near one another but typically do not overlap. However, configurations where the ends overlap may also be used according to the embodiments disclosed herein. The display can be disposed on either side of a substrate, and thus can be disposed on a portion of the device that is convex when the device is in a collapsed configuration, a portion of the device that is concave when the device is in a collapsed configuration, or both.

A device as disclosed herein may include series of ribs physically connected to a flexible display such as an OLED display with an active matrix backplane. The ribs may be configurable from a first rib configuration, which prevents the display from flexing in at least one direction, to a second rib configuration that allows the flexible display to flex in at least one direction. The ribs may be configured to maintain the flexible display in the first display configuration when the ribs are in the first rib configuration. That is, the ribs may have a configuration that provides sufficient rigidity to the structure of the device that the device is prevented from flexing in at least one direction. The ribs may be composed of a variety of materials such as a plastic, aluminum, titanium, steel, other metals, ceramic, wood, hardened glass, cardboard, stone, carbon fiber or other composite materials depending on the intended application.

In a configuration, the ribs may be rigid, vertical, and tightly spaced. The ribs may be substantially parallel and allow the flexible display to flex in a direction substantially perpendicular to the ribs. For example, they may be attached to the back of a flexible display to limit the display's flexibility in a horizontal direction relative to the typical display orientation of the flexible display. For example, a first display configuration may be substantially flat while the flexible display may be rolled or curved in a second display configuration, such as where a wide-screen or similar format display is rollable in a horizontal direction, for example to allow for storage or movement of the display. The use of a rollable display in general is described in further detail in U.S. Pat. No. 7,050,835, the disclosure of which is incorporated by reference in its entirety. Such rollable displays may be suitable for use with embodiments disclosed herein that incorporate a rollable or other flexible display and a plurality of ribs that allow and/or prevent rolling or flexing in at least one configuration.

Embodiments disclosed herein may allow for and/or be used with a variety of devices and device configurations. For example, a device may incorporate a flexible display with support ribs that allows that device to be converted from a first configuration in which it is approximately the form factor of a smart phone or similar device, to a second configuration in which it is approximately the form factor of a tablet computer or similar device. When the device is arranged in the larger configuration, the ribs may provide sufficient support to the flexible display that minimal or no other housing or support is required to maintain the flexible screen in the larger configuration. FIGS. 4A-4D show various views of an example of such a device.

Figure 4A:
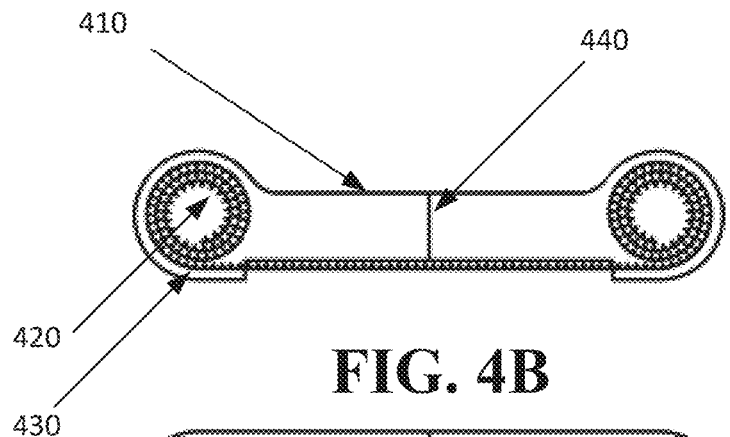
FIG. 4A is an example of a device completely enclosed by a housing as disclosed herein.
Figure 4B:
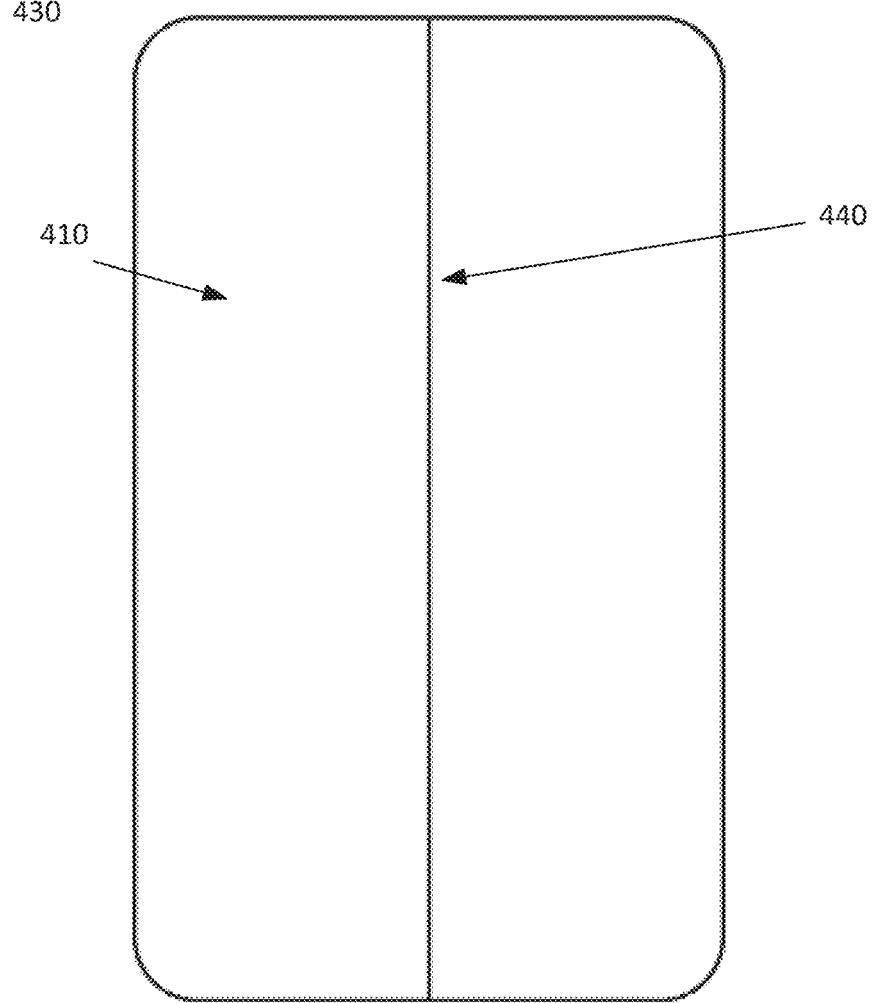
FIG. 4B is a back view of a housing as disclosed herein.

FIG. 4A shows an example of a flexible display 430 completely enclosed by a housing 410, where the device is arranged in a first rib configuration with a first curvature. As previously described, the device shown in FIGS. 4A-4D may have, for example, a form factor approximately the same as a smartphone or other relatively small portable computing device. FIG. 4A shows a slice of the housing cut through the horizontal axis to provide a top-down view. The ribs 420, shown from above in triangular cross-section, are arrayed vertically on the back side of the display. In the illustrated configuration the flexible display 430 is rolled on itself at two ends. The housing 410 is separable at the midpoint 440. FIG. 4B shows the back of the housing 410, with the flexible screen 430 still completely enclosed by it.

In FIG. 4C, the housing 410 is separated at the midpoint 440 to reveal the front of the flexible display 430. The flexible display 430 is substantially flat when the housing 410 is completely separated to unfurl the screen. FIG. 4C shows a top down view of the display and housing.

FIG. 4D shows the back of the unfurled screen and housing 410 in a separated configuration, where the ribs are disposed in a second rib configuration that provides a second curvature to the flexible display. The vertically arrayed rigid ribs 420 are visible in this configuration and prevent movement of the flexible display 430 in the vertical direction. As the housing 410 is pulled apart, a mechanical feature in the mouth of the housing 410 may interact with stiffening elements 450. For example, a zipper-like mechanism may turn the stiffening elements 450 as the screen is being rolled or unfurled. The ribs also may be activated by electrical or other means as disclosed herein, and may have other arrangements that the specific example shown.

Figure 4E:
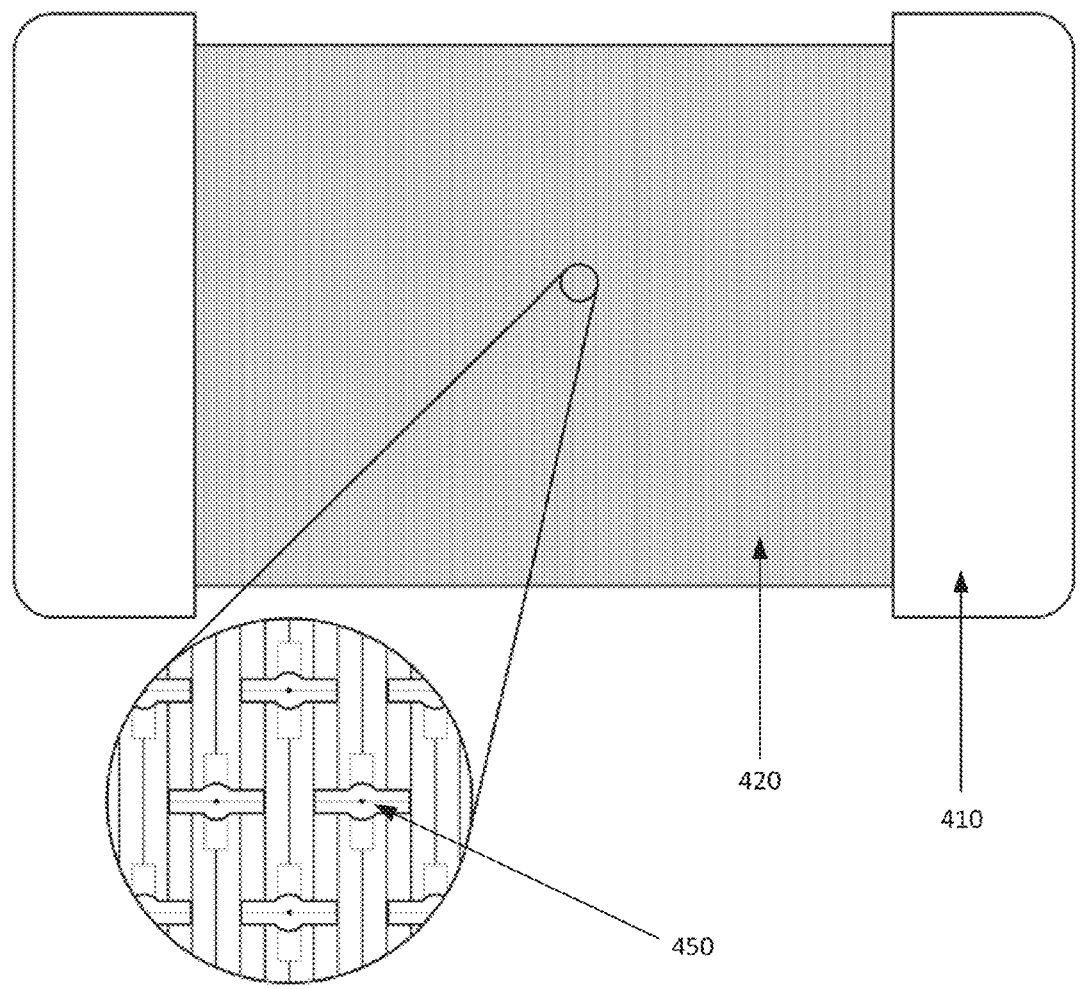
FIG. 4E shows an example of stiffening elements attached to ribs as disclosed herein.

FIG. 4E shows an example of stiffening elements 450 attached to the ribs. The stiffening elements 450 may be oriented perpendicular to the direction of the vertical rigid ribs 420 which causes the screen to be substantially less flexible in the horizontal direction. The stiffening elements 450 may be activated by a mechanism in the device, such as a physical switch that is activated when the device is moved to the larger configuration, and/or an electrical signal that is delivered to the stiffening elements 450 such as upon activation of the physical switch. When arranged as shown in the close-up view in FIG. 4E, the stiffening elements 450 prevent the flexible display from rolling into the housing 410. That is, the stiffening elements 450 may maintain the flexible display in the configuration shown in FIGS. 4C-4D and may prevent the screen from returning to the rolled configuration shown in FIGS. 4A-4B.

The stiffening elements 450 are arrayed in a staggered configuration in the example shown in FIG. 4E. Other arrangements of the stiffening elements 450 may be used. For example, the density of stiffening elements 450 per area of the flexible display may be increased or the length of the stiffening elements 450 may be altered. Similarly, other housing 410 configurations may be used. For example, the housing 410 may enclose nearly the entire flexible display 430 in one end.

As previously described, the stiffening elements 450 may be physically connected to the ribs 420. When activated, the stiffening elements 450 may maintain the ribs 420 in the second rib configuration and thereby maintain the flexible display in the expanded second configuration. The stiffening elements 450 may be, for example, motorized arms, motorized rods, rotating pins, pneumatic bladders, electromagnets or the like. The stiffening elements 450 may be disposed between each pair of adjacent ribs 420 in some configurations. Although shown in the context of the device illustrated in FIGS. 4A-4D, it will be understood that the stiffening elements 450 shown in 4E or similar stiffening elements may be used with any device that incorporates a flexible display as disclosed herein.

Figure 5A:
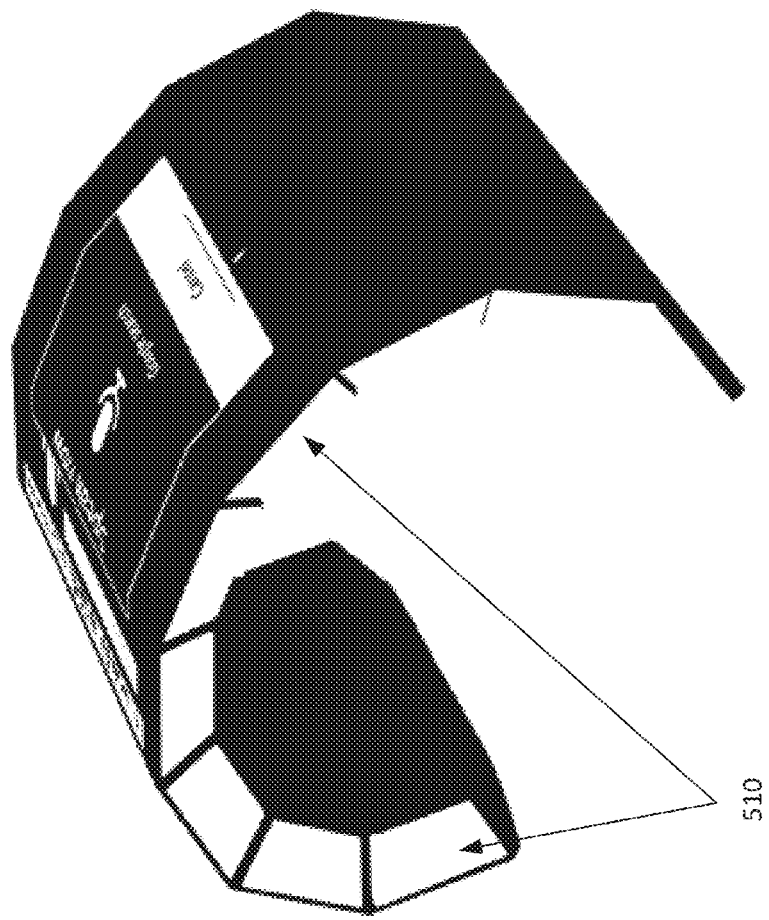
FIG. 5A shows an example of a cell-phone sized device in a shape that can be worn as a wrist watch as disclosed herein.
Figure 5B:
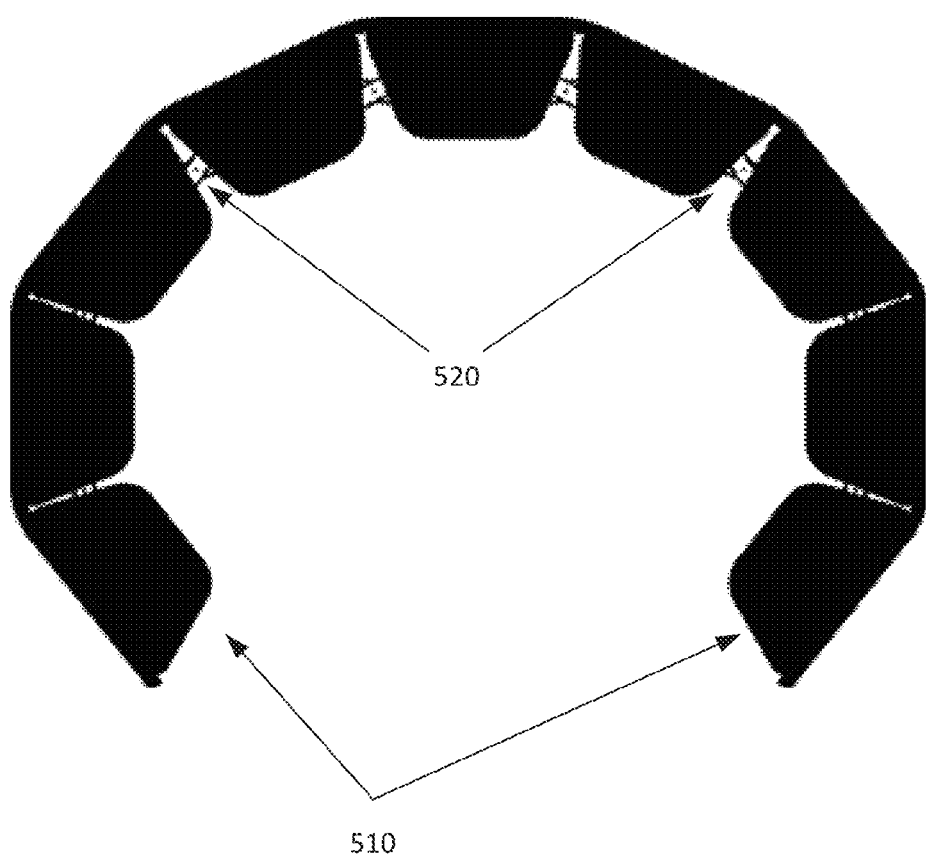
FIG. 5B shows an example of stiffening elements between adjacent ribs as disclosed herein.

The ribs may have different dimensions (height, width, length) that, for example, allow the device to remain relatively small and thin. They may also be constructed large enough to house rigid electronics, batteries, or other components of a device that may benefit from maintaining a relatively non-flexible configuration, or for which a non-flexible version provides a cost or manufacturing complexity benefit. For example, the configuration shown in FIG. 4 may be a tablet-sized screen that rolls out of a cell-phone-sized housing. In such a case, small and thin ribs as shown in FIG. 4 may be preferred. FIG. 5A shows an example rib configuration that uses relatively fewer and larger ribs 510 than the configuration shown in FIGS. 4A-4E. The device shown in FIG. 5A may be, for example, approximately the size of a cell phone, and configurable into a "C" shape such as to be worn around a wrist. The ribs 510 in this example may contain some or all of the electronics and batteries necessary for the device to function. Stiffening elements 520 may be disposed between the large ribs 510 to prevent creasing of the flexible display as shown in FIG. 5B.

Figure 5C:
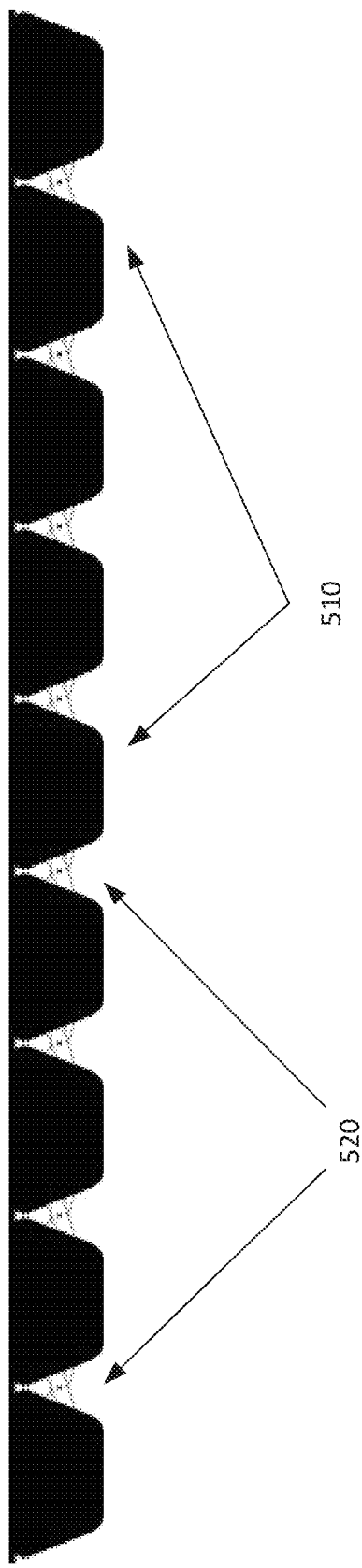
FIG. 5C shows a cell-phone sized device in a straight conformation in response to detecting a tension as disclosed herein.

A rib may receive a signal to convert from the first configuration to the second configuration. Examples of a signal include, but are not limited to, an electrical impulse, a tension at least at one end of the display, and a compression of at least one end of the display. In the case of devices such as illustrated in FIGS. 5A-5C, one or more sensors may be located in one or more of the ribs that automatically adjust the degree of each bend, such as to accommodate different wrist sizes. The sensor may include a temperature sensor, a light sensor, a touch sensor, or any other suitable sensor that can determine when a portion of the device is disposed against another surface, such as a user's wrist. A sensor may also be located in the side of a rib or be a component of a stiffening element. The sensor may automatically straighten the device when it detects that the user is attempting to remove it from the wrist. FIG. 5C shows an example of a straightened device, where the stiffening elements 520 may act to maintain the device in the configuration shown.

Figure 6A:
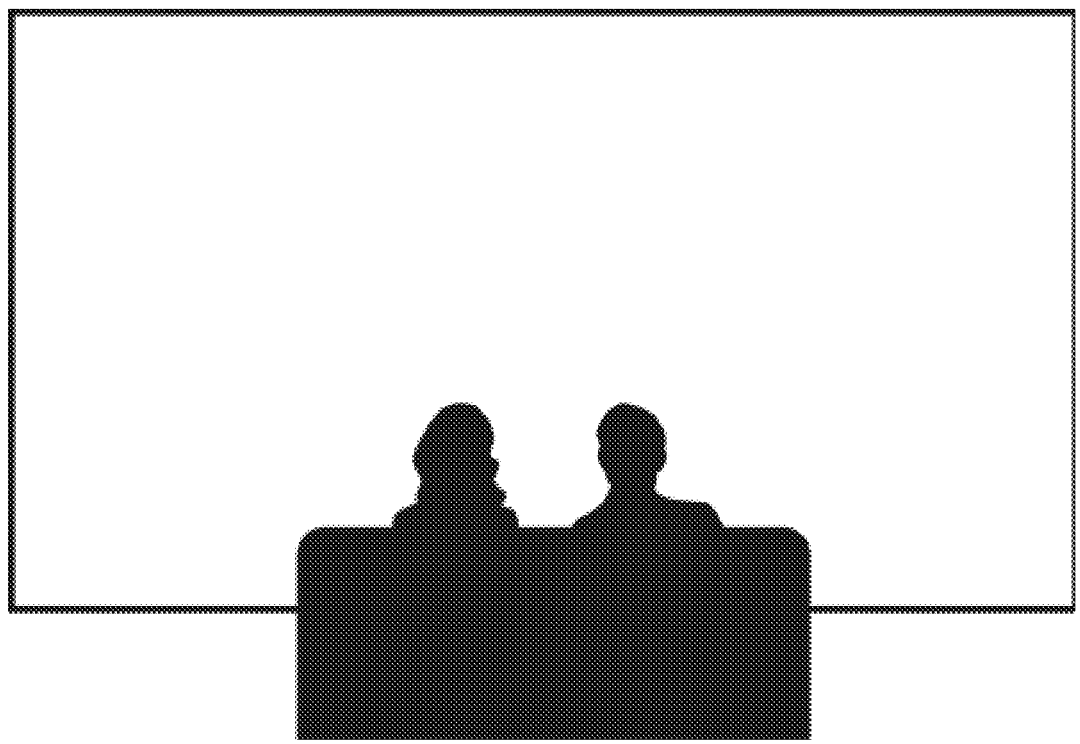
FIG. 6A shows an example large-screen flexible display as disclosed herein.
Figure 6B:
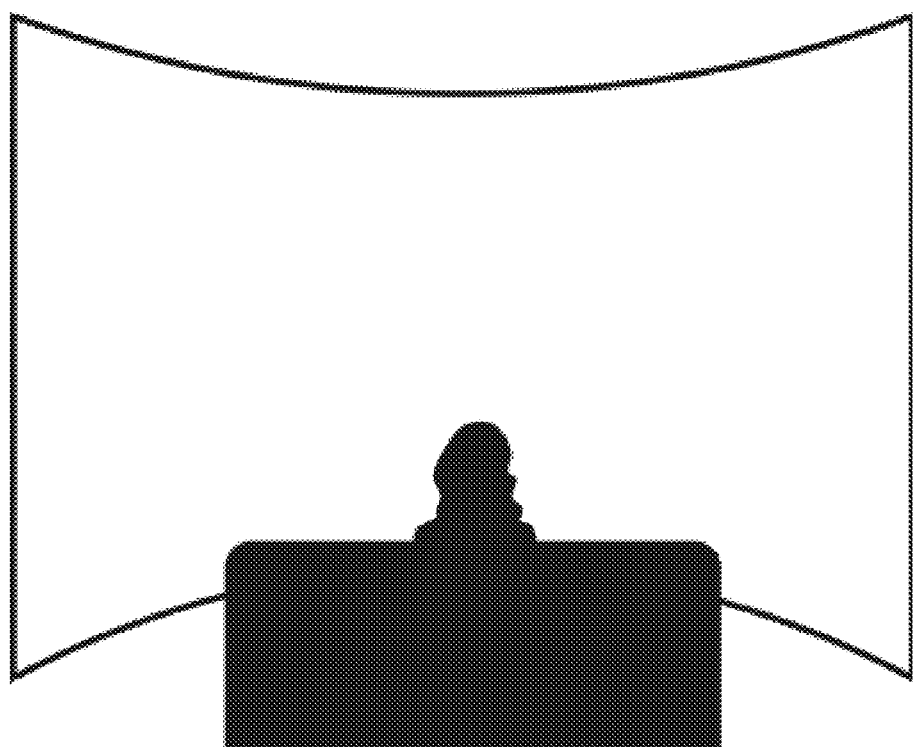
FIG. 6B shows a display as shown in FIG. 6A with the two ends curved inward.

A flexible display as disclosed herein may be a component of a variety of devices including, but not limited to, a smartphone, a tablet, a wrist watch, a television, a digital picture frame, and a cylindrical lamp shade. For example, FIG. 6A shows a wall-sized flexible display that is flat against a wall. The display may have stiffening elements attached to vertically arrayed ribs as previously described. The display may be configurable from the arrangement shown in FIG. 6A, to a second arrangement in which the display is partially or entirely curved away from the wall and maintained as a rigid display in the curved shape to create an immersive, panoramic, wrap-around type display as shown in FIG. 6B. As previously described, ribs connected to the display may be activated to maintain the curvature shown in FIG. 6B, and may be deactivated or reconfigured to allow the display to flex when moving from the flat configuration shown in FIG. 6A to the curved configuration shown in FIG. 6B. Similarly, the ribs may be configured to maintain the display in any other curvature between those shown in FIGS. 6A and 6B.

Figure 7A:
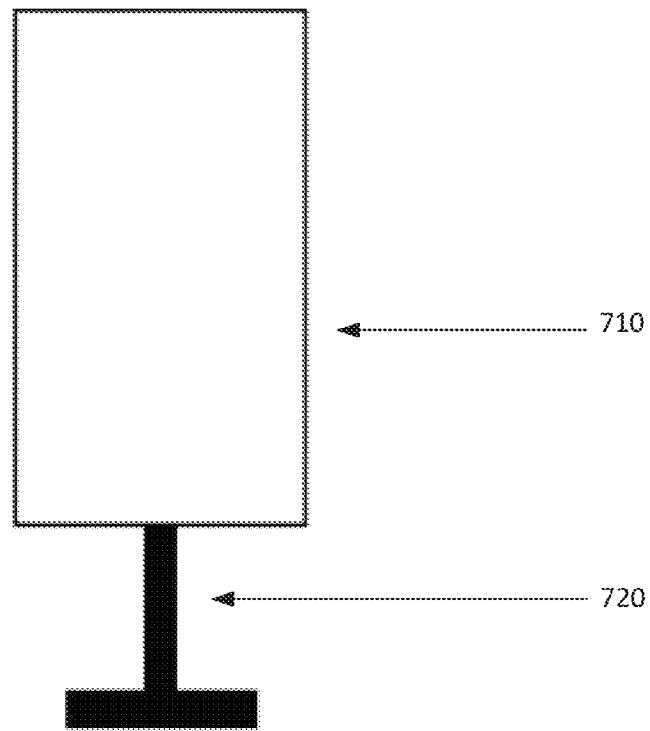
FIG. 7A is an example of a flexible display as disclosed herein.
Figure 7B:
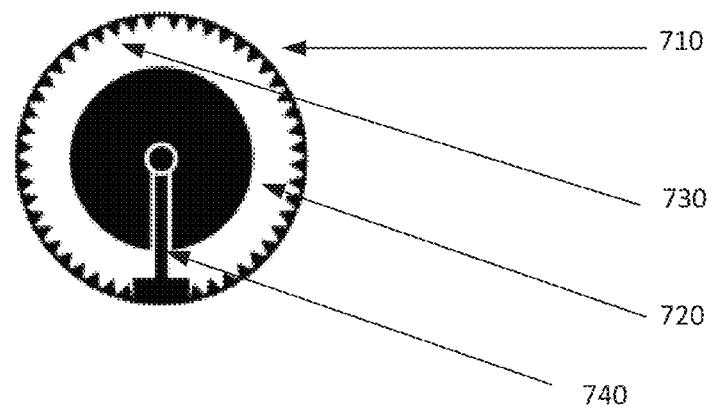
FIG. 7B shows a top-down view of a flexible display as shown in FIG. 7A.
Figures 7C, 7D:
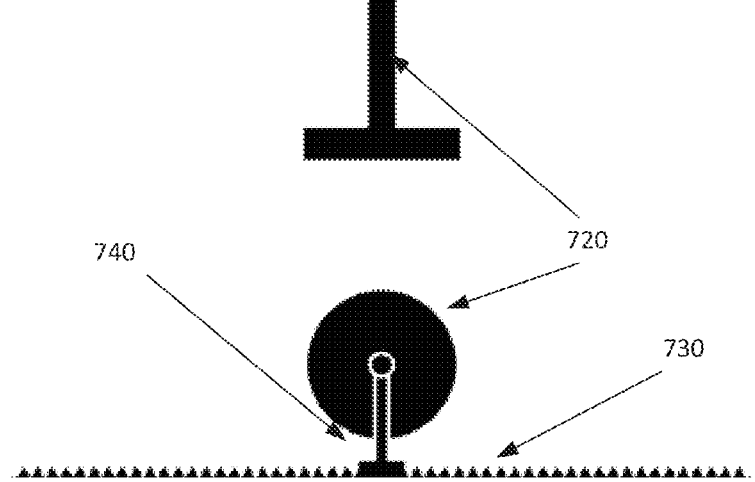
FIG. 7C shows a device from FIGS. 7A and 7B with the display unfurled.
FIG. 7D shows a top-down view of a display as shown in FIG. 7C.
Figure 7E:
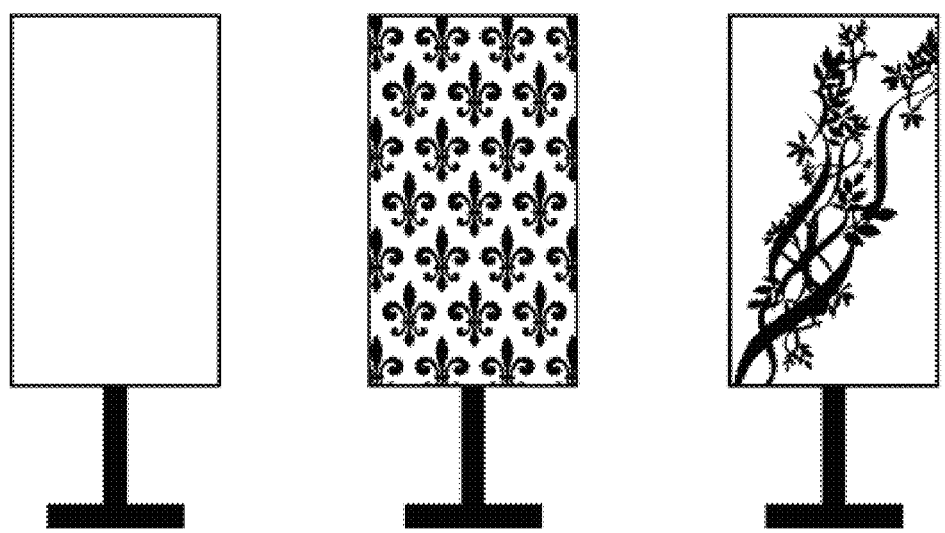
FIG. 7E provides example patterns that could be shown on a display when it is in a rolled configuration.

As another example, a display as disclosed herein may also be used as a lamp-TV hybrid device. FIG. 7A shows an example of a display that appears similar to a conventional lamp with a cylindrical shade 710 and a center mount 720. The shade 710 may be formed of a flexible OLED screen backed with rigid, mechanized ribs 730 as previously described herein. FIG. 7B shows a top down view of the lamp-TV hybrid device with rigid ribs 730, a center mount 720, and a control arm 740 that contacts the at least one rib. The shade 710 may be unrolled into a relatively flat display by, for example, signaling stiffening elements to engage or push against two adjacent ribs 730. FIG. 7C shows the front of the display in an unfurled state and FIG. 7D shows a top down view of the display with the control arm 740 and center mount 720 shown. The display may remain centered and be stabilized by the control arm 730 that contacts at least one of the ribs on the back of the display. As previously described, the ribs may act to maintain the display in each of the illustrated configurations shown, and/or any intermediate configuration. The display may be signaled to roll into the shade formation by similar mechanisms discussed earlier. While in the shade formation, the display may show patterns or images that can be configured by a user. Some potential patterns to show on the display while it is in the shade shape are shown in FIG. 7E. It will be understood that the specific patterns shown are illustrative only, and that generally any image, pattern, or the like may be shown on the display when it is in the rolled and/or flat configurations. A skilled practitioner will also understand that the displays disclosed herein may also be used to provide general illumination. For example, when configured as a lamp shade, the display may emit white or other uniform light.

Figure 8:
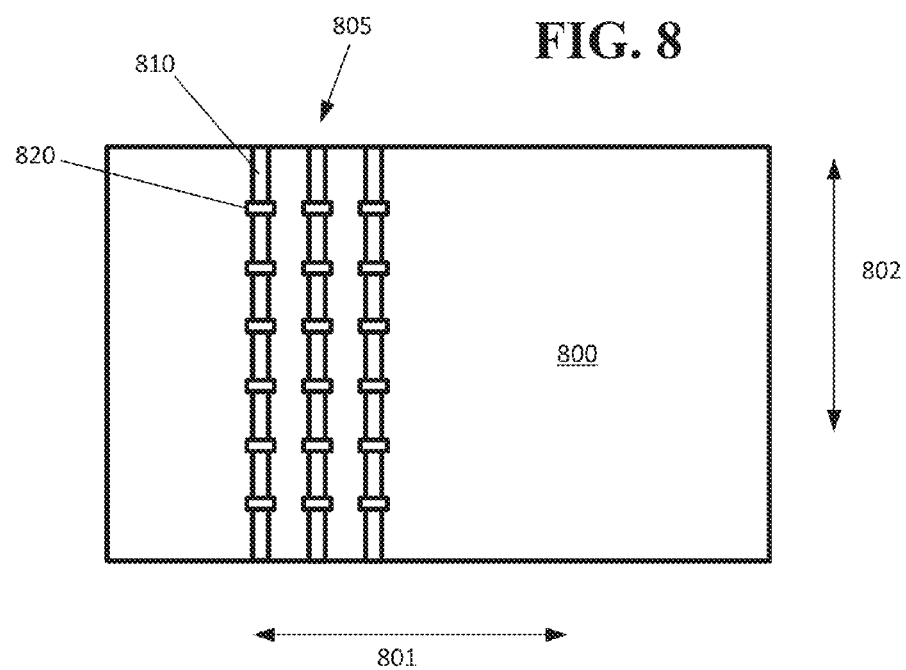
FIG. 8 shows a schematic representation of a display connected to multiple ribs having multiple rigid members.

In some configurations, the ribs disclosed herein may include one or more rigid members, which may be connected to allow for the display to flex in multiple directions. For example, each rib may have multiple segments connected by mechanical hinges or similar connections. The ribs may be arranged to allow an attached flexible display to flex in a direction perpendicular to the ribs as previously disclosed. In addition, the rigid members may allow the display to flex in a direction parallel to the ribs. FIG. 8 shows a schematic illustration of an example configuration in which each rib includes multiple rigid members connected by hinged portions. A display 800 may be connected to multiple ribs 805 as previously described. The ribs may operate substantially as disclosed with respect to FIG. 4, i.e., each rib may include stiffening elements that are rotatable or otherwise configurable to maintain the display 800 in a desired configuration. The ribs and stiffening elements may operate to allow or prevent the display 800 to flex in a direction 801 perpendicular to the ribs as previously described. In addition, each rib may include a series of rigid members 810 hingedly connected to one another, such as by hinge portions 820 which may be mechanical, piezoelectrical, or any other suitable connection. Thus, the device also may be flexible in a second direction 802 substantially parallel to the ribs. The combination of elements illustrated in FIG. 8 may be used in conjunction with those illustrated in FIG. 4. For example, the rigid members 810 may be rotatable relative to the display, and thus operate as the stiffening elements shown in FIG. 4. In addition or alternatively, a series of ribs 805 may include both the stiffening elements of FIG. 4 and the rigid members shown in FIG. 8. It will be understood that FIG. 8 shows a simplified, enlarged view of a subset of ribs relative to a display for clarity, and that the particular scale and arrangement shown is not intended to be shown to scale.

In some cases, a larger area of the display may be visible in a first display configuration than in a second display configuration. For example, the lamp shade shown in FIG. 7A may be considered a first display configuration while the unfurled lamp shade shown in FIG. 7C, which resembles a conventional display, may be considered a second display configuration. The amount of the display visible to a user looking at the shade is smaller than that of the unfurled display. As another example, a smaller portion of the flexible display is visible to a user in FIGS. 4A and 4B, where the display is in a rolled configuration, than in FIGS. 4C and 4D, where the display is in an unrolled, expanded configuration.

The flexible device disclosed herein may also be configurable into a third device configuration that has a third curvature. The third curvature may be different from the first curvature and the second curvature. For example, a 40 inch TV monitor may be rolled on itself to form a cylindrical shape, representing a first device configuration with a high amount of curvature. The device may be unfurled and curved inward toward a user viewing the device's display, similar to the movie screen shown in FIG. 6B, representing a second device configuration with less curvature than the device display configuration. The device may also be unfurled in a completely flat conformation, similar to FIG. 7C, representing a third device configuration that has a curvature between the first curvature and the second curvature. In general, a device connected to a series of ribs as disclosed herein may be arranged in any desired configuration between a first, fully curved or collapsed configuration and a second, fully expanded or flat configuration. However, depending upon the configuration desired, the first and second configurations need not be completely rolled or completely flat, i.e., a minimum and maximum curvature or other limit may be imposed upon the device beyond that which would otherwise be possible for the flexible display.

More generally, a device as disclosed herein may include a flexible display, a plurality of ribs, and a locking mechanism. The locking mechanism may convert the ribs from a first configuration to a second configuration. The first configuration may allow the display to flex while the second configuration may cause the display to remain rigid. As above, the ribs may receive a signal that instructs them to convert from the first configuration to the second configuration. The locking mechanism may be one or more stiffening elements, as described earlier.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The invention claimed is:

1. A device comprising:
   a flexible electronic display configurable from a first device configuration having a first curvature to a second device configuration having a second curvature different from the first curvature;
   a plurality of ribs physically connected to the flexible electronic display, and configurable from a first rib configuration that prevents the flexible electronic display from flexing in at least one direction to a second rib configuration that allows the flexible electronic display to flex in the at least one direction; and
   a plurality of stiffening elements physically connected to the plurality of ribs which, when electrically activated, maintain the plurality of ribs in the first rib configuration, wherein each of the plurality of stiffening elements is connected to at least two adjacent ribs.

2. The device as recited in claim 1, wherein the flexible electronic display comprises an emissive device.

3. The device as recited in claim 1, wherein the first device configuration is flat.

4. The device as recited in claim 1, wherein the plurality of ribs are configured to receive an electrical impulse that causes the plurality of ribs to convert between the first rib configuration and the second rib configuration.

5. The device as recited in claim 1, further comprising a plurality of rigid members hingedly connected to each of the plurality of ribs.

6. The device as recited in claim 1, wherein the plurality of ribs are configured to maintain the flexible electronic display in the first device configuration when the plurality of ribs are in the first rib configuration.

7. The device as recited in claim 1, wherein the plurality of ribs are arranged in a first direction and allow the flexible electronic display to flex only in a second direction that is orthogonal to the first direction.

8. The device as recited in claim 1, wherein the plurality of ribs are parallel and allow the flexible electronic display to flex in a direction parallel to the ribs.

9. The device as recited in claim 1, said flexible electronic display configurable in a third device configuration having a third curvature different from the first curvature and the second curvature.

10. The device as recited in claim 1, wherein the plurality of stiffening elements comprises an element type selected from the group consisting of motorized rods, rotating pins, and pneumatic bladders.

11. The device as recited in claim 1, wherein at least one of the plurality of stiffening elements is disposed between each pair of adjacent ribs.

12. The device as recited in claim 1, wherein the device comprises an organic light emitting device.

13. The device as recited in claim 1, wherein the device is a component of an item selected from the group consisting of: a smartphone, a tablet, a wrist watch, a television, a digital picture frame, a cylindrical lamp shade, and a light source.

14. The device as recited in claim 1, wherein a larger area of the display is visible in the first display configuration than in the second display configuration.

15. The device as recited in claim 1, wherein the plurality of stiffening elements alter the rigidity of the device.

16. The device as recited in claim 1, wherein the device comprises an active matrix backplane.

17. The device as recited in claim 1, wherein the plurality of stiffening elements are aligned in parallel with the plurality of ribs in the second rib configuration.

18. A device comprising:
    a flexible electronic display;
    a plurality of ribs;
    a locking mechanism that converts the ribs from a first configuration in which the ribs allow the device to flex to a second configuration that causes the flexible electronic display to remain rigid; and
    a plurality of stiffening elements physically connected to the plurality of ribs which, when electrically activated, maintain the plurality of ribs in the first rib configuration, wherein each of the plurality of stiffening elements is connected to at least two adjacent ribs.

19. The device as recited in claim 18, wherein the flexible electronic display comprises an emissive device.

20. The device as recited in claim 18, wherein the plurality of ribs are attached to the flexible electronic display.

21. The device as recited in claim 18, wherein the plurality of ribs are configured to receive an electrical impulse that causes the plurality of ribs to convert between the first configuration and the second configuration.

22. The device as recited in claim 18, wherein each of the plurality of ribs comprises a rigid member.

23. The device as recited in claim 18, wherein the plurality of ribs are configured to maintain the flexible electronic display in a flat configuration when the plurality of ribs are in the second configuration.

24. The device as recited in claim 18, wherein the plurality of ribs are arranged in a first direction and allow the flexible electronic display to flex only in a second direction that is orthogonal to the first direction.

25. The device as recited in claim 18, wherein the plurality of ribs are parallel and allow the flexible electronic display to flex in a direction parallel to the ribs.

26. The device as recited in claim 18, wherein the plurality of stiffening elements comprises an element type selected from the group consisting of motorized rods, rotating pins, and pneumatic bladders.

27. The device as recited in claim 18, wherein at least one of the plurality of stiffening elements is disposed between each pair of adjacent ribs.

28. The device as recited in claim 18, wherein the device comprises an organic light emitting device.

29. The device as recited in claim 18, wherein the device is a component of an item selected from the group consisting of: a smartphone, a tablet, a wrist watch, a television, a digital picture frame, and a cylindrical lamp shade.

30. The device as recited in claim 18, wherein the device comprises an active matrix backplane.

\* \* \* \* \*